United States Patent
Ahtila et al.

(10) Patent No.: US 10,329,505 B2
(45) Date of Patent: Jun. 25, 2019

(54) METHOD FOR PRODUCING BIOFUEL AND USE OF BIOFUEL

(71) Applicant: Aalto University Foundation sr, Aalto (FI)

(72) Inventors: Pekka Ahtila, Helsinki (FI); Esa Viljakainen, Jämsänkoski (FI)

(73) Assignee: Aalto University Foundation sr, Aalto (FI)

( * ) Notice: Subject to any disclaimer, the term of this patent is extended or adjusted under 35 U.S.C. 154(b) by 0 days.

(21) Appl. No.: 14/783,091

(22) PCT Filed: Apr. 8, 2014

(86) PCT No.: PCT/FI2014/050252
§ 371 (c)(1),
(2) Date: Oct. 8, 2015

(87) PCT Pub. No.: WO2014/167182
PCT Pub. Date: Oct. 16, 2014

(65) Prior Publication Data
US 2016/0060557 A1 Mar. 3, 2016

(30) Foreign Application Priority Data
Apr. 8, 2013 (FI) .................................. 20135341

(51) Int. Cl.
*C10L 5/44* (2006.01)
*C10F 7/02* (2006.01)
*C10F 5/00* (2006.01)
*C10L 1/04* (2006.01)
*C10L 5/36* (2006.01)

(52) U.S. Cl.
CPC ........ *C10L 5/44* (2013.01); *C10F 5/00* (2013.01); *C10F 7/02* (2013.01); *C10L 1/04* (2013.01); *C10L 5/36* (2013.01); *C10L 5/363* (2013.01); *C10L 5/366* (2013.01); *C10L 5/442* (2013.01); *C10L 5/445* (2013.01);
(Continued)

(58) Field of Classification Search
USPC ................ 44/492, 530, 589, 590, 605, 606; 585/240, 242
See application file for complete search history.

(56) References Cited

U.S. PATENT DOCUMENTS

| 4,229,183 A | 10/1980 | Eneroth et al. |
| 4,326,913 A | 4/1982 | Mattsson |

(Continued)

FOREIGN PATENT DOCUMENTS

| AT | 508715 A1 | 3/2011 |
| CH | 494096 | 9/1970 |

(Continued)

*Primary Examiner* — Prem C Singh
*Assistant Examiner* — Chantel L Graham
(74) *Attorney, Agent, or Firm* — Seppo Laine Oy

(57) ABSTRACT

The present invention relates to a method for manufacturing a biofuel from a vegetable-based biomaterial by performing the manufacture in an integrated manner, in such a way that the biomaterial is made finer and dried with the aid of heat brought from a heat-releasing process, when the drying is finally performed after the finer making stage, optionally in such a way that drying is started already in connection with finer making. The invention also relates to a biofuel manufactured in this manner and the use of the fuel in question.

18 Claims, 4 Drawing Sheets

(52) U.S. Cl.
CPC ....... *C10L 2290/08* (2013.01); *C10L 2290/28* (2013.01); *Y02E 50/10* (2013.01); *Y02E 50/30* (2013.01)

(56) References Cited

U.S. PATENT DOCUMENTS

2008/0028634 A1    2/2008   Leahy
2011/0209977 A1    9/2011   Rolland et al.

FOREIGN PATENT DOCUMENTS

| EP | 2025738 A1 | 2/2001 |
|---|---|---|
| EP | 2045057 A1 | 4/2009 |
| FI | 122243 B | 10/2011 |
| FR | 1405504 A | 7/1965 |
| FR | 2044886 A6 | 2/1971 |
| GB | 2448547 A | 10/2008 |
| JP | 2003268394 A | 9/2003 |
| WO | WO0189730 A2 | 11/2001 |
| WO | WO0210319 A2 | 2/2002 |
| WO | WO 200681645 A1 | 8/2006 |
| WO | WO2010081726 A2 | 7/2010 |
| WO | WO2010093310 A1 | 8/2010 |
| WO | WO2010146223 A1 | 12/2010 |
| WO | WO2011087437 A1 | 7/2011 |

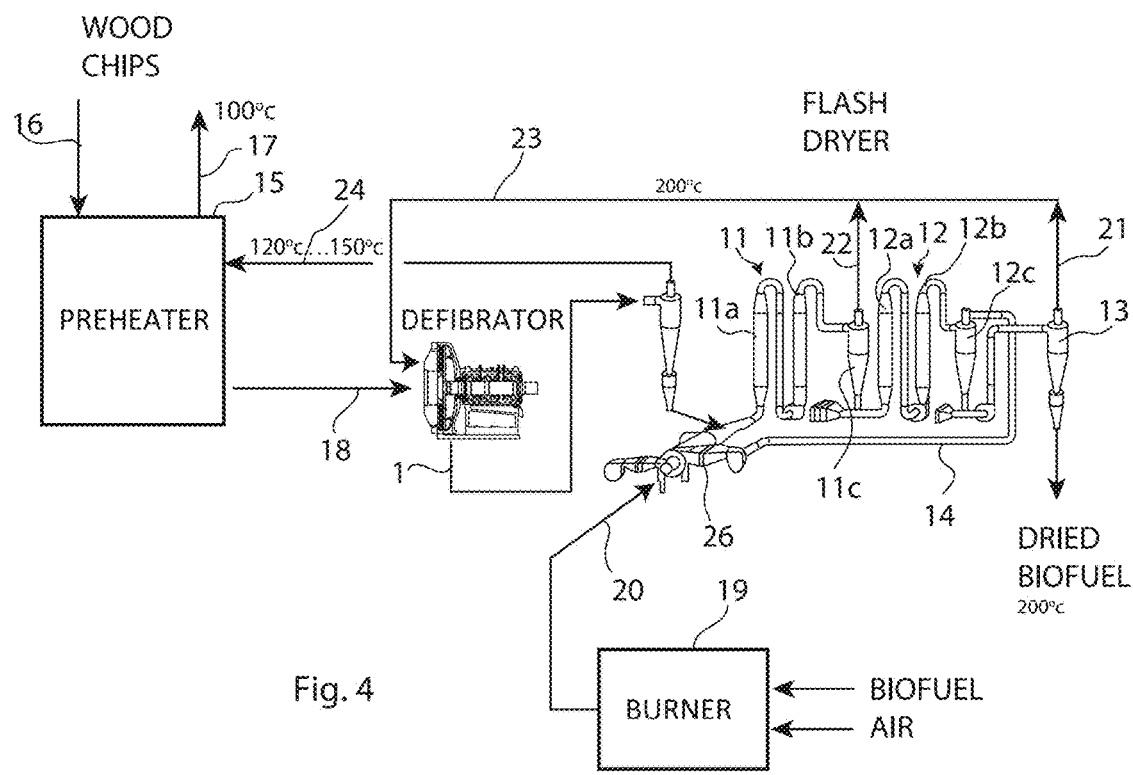
Fig. 4
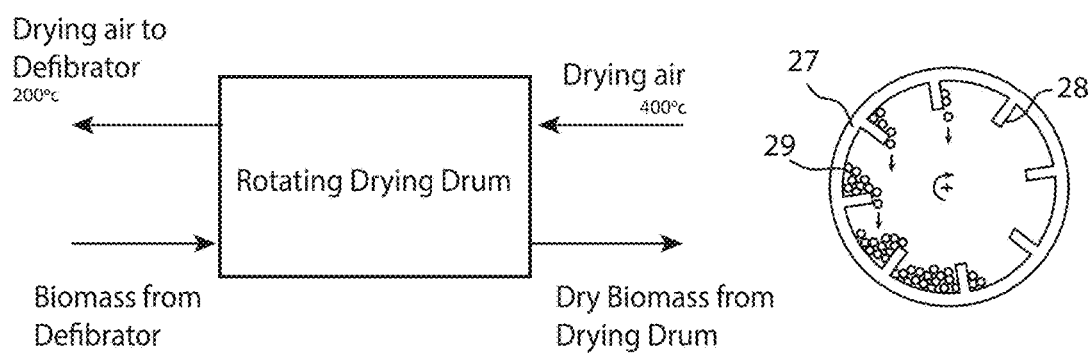
Fig. 5
Fig. 6

METHOD FOR PRODUCING BIOFUEL AND USE OF BIOFUEL

SUBJECT OF THE INVENTION

The present invention relates to a method for manufacturing a biofuel or its precursor from a vegetable-based biomaterial. The invention further relates to a biofuel manufactured using this method and to its use.

PRIOR ART

Nowadays the manufacture of biofuels seeks to exploit various biomasses as fully as possible. The raw materials can come from, among other places, a forest, agriculture, or manure, or they can be waste, such as municipal, agricultural, or process-industry waste. The raw material can be burned directly or it can be treated mechanically, chemically, or biochemically (e.g. with the aid of bacteria) to produce a mass that is suitable for the further refining of the fuel.

The biomass is made into a most effectively processable form by disintegrating it into its constituent parts. Thus, nearly all organic matter is suitable as a raw material, i.e. even the largest pieces obtained from trees, such as felling waste. Drawbacks of these methods are, however, the large number of process stages and the complexity of the equipment required.

Publication EP 2045057 A1 discloses a production method for manufacturing a biofuel. In the method, chipping is combined with defibration by means of a disc refiner in order to manufacture wood particles with an even size distribution. The publication also depicts combining chipping with defibration/grinding. The combination of flash drying or some other drying method with defibration does not appear in the publication.

Publication U.S. Pat. No. 4,326,913 discloses a method and apparatus for defibrating wood chips or vegetable matter, in which the vapour removed from the mass is utilized in the removal of the mass from the defibrator and the mass can be dried by feeding the mass directly from the defibrator to drying. There is no reference in the publication in question to the use of the mass created as a biofuel, nor is the drying integrated in the defibration. Drying using the apparatus in question also demands a very homogeneous material in order to work effectively.

Publication JP 2003268394 discloses a waste-wood disintegration method depicted with a vertically rotating refiner, in which the ground material is dried and blown away from the edge of the refiner to a rotating separator. As above, in the method according to this publication refining and drying are not integrated with each other.

Publication WO 2006/081645 A1 discloses a method and end product for manufacturing pellets made from waste biomass, in which manufacture comprises first of all drying of the biomass using hot air, after which it is ground in a refiner and led through a separator to pelletizing. The preamble of the publication describes the effects of drying on the thermal value of the pellets. The publication refers to hot air being used in drying and to a drum or tubular dryer. The equipment to be used in refining is not specified in detail.

Publication WO 02/10319 A2 discloses replacing fossil fuels with an organic fuel manufactured and ground from waste wood containing bark by means of a refining method. In the publication, the particle size of the ground wood powder is defined as less than 300 micrometres. The publication does not specify the refining/pulverization method of the organic waste material, nor does it refer to a combined defibration/drying process, instead the wood material is dried before refining, as in the method of the previous publication. It is, however, clear that the drying of the unrefined particles is separate from the drying of the refined mass, or integrated refining and drying, because the drying affects the larger particles mainly on their surface.

Publications U.S. Pat. No. 4,229,183, U.S. 2008028634, U.S. 2011209977, and U.S. Pat. No. 4,326,913 disclose methods, in which the heat from flue gases arising from the combustion of a biofuel is used to dry a biofuel that is refined or to be refined. In the solutions of these publications, grinding takes place in a known manner by crushing in a hammer mill, a ball mill, or similar.

The publications referred to do not disclose a method for manufacturing a biofuel, in which the refining and drying of the initial material (biomaterial) would be rapid and efficient, i.e. in which a high dry-matter content would be obtained in a short time and in which refining and drying would be arranged in production-economically efficient manner.

SUMMARY OF THE INVENTION

One intention of the present invention is to create a method for making a biomaterial finer into pieces of a suitable size, so that drying will be rapid and effective, but while nevertheless preventing the risk of a dust explosion and other operating disturbances.

The invention is specifically intended to create a method for manufacturing a biofuel from a vegetable-based biomaterial.

The intention of the invention is thus a method for the manufacture of a biofuel or its precursor from a vegetable-based biomaterial. The method is characterized by manufacture being performed in an integrated process, in which a biomaterial is made finer and dried with the aid of heat taken from a heat-releasing process. The method is further characterized by drying being completed after the finer making stage and preferably in such a way that drying is commenced already in connection with finer making The invention also relates to the use of a biofuel or its precursor, manufactured with the aid of the method, in which
  it is burned in the same combustion plant, from which the heat taken for its drying has been obtained, or it is transported to a separate combustion plant to be burned;
  pellets are made from it for later use; or
  a refined, preferably liquid, finished fuel is manufactured from it.

Further the invention relates to a biofuel, or its precursor, manufactured with the aid of this method.

Considerable advantages are obtained with the aid of the invention, to which the following can be referred to in particular:
  energy efficiency (lower energy consumption than in known methods),
  simple equipment,
  any vegetable-based biomaterial whatever is suitable (timber need not even be separately debarked),
  the finer biomaterial is obtained as suitably-sized pieces (sliver mass).

Particularly, the biomaterial is made finer to a sufficiently small particle size, in which drying is rapid and effective, but at the same time the particle size is left sufficiently large to prevent the risk of a dust explosion and other operating disturbances.

The method according to the invention is energy-efficient and the heat required for drying can be obtained from a combustion process in connection with the manufacturing process, or from some other process releasing heat, for example, from a combustion process that is connected to the production of some other good, for example to the production of high-pressure steam and electricity, and/or to the production of heat for district heating.

Thus a fuel is created, by means of which the use of fossil fuels, such as coal and oil, can be partly or totally replaced in power plants and heating plants. Thus carbon dioxide emissions are also reduced.

The idea of the invention is based on making vegetable material finer by defibration. Now the use of the technique usually used for manufacturing mechanical pulp for the manufacture of combustible mass has, however, considerable advantages and features, which are not achieved by means of traditional crushing or based on some other technique. First of all, by defibration a sliver mass of very even quality is obtained, which is nearly completely lacking explosive and dirting dust created in crushing. Such a sliver mass is easier and safer to handle. On the other hand, the grinders used for defibration demand, in order to operate, a gaseous medium flow to transport the chips and pulverized mass through the grinder. Usually, this medium is a hot gas or steam, in the case of our invention preferably hot flue gas. As a consequence of this, the drying of the mass starts effectively already in the grinder and at the same time the lignin contained in the vegetable mass softens, assisting defibration. This further leads to lower energy consumption and an improvement in the evenness of the quality of the sliver mass.

BRIEF DESCRIPTION OF THE DRAWINGS

FIG. 4 shows an alternative circuit for implementing the invention.

FIG. 5 is a schematic diagram of the mass flows of one dryer suitable for use in connection with the invention.

FIG. 6 is a cross-section of the dryer of FIG. 5.

DETAILED DESCRIPTION OF THE INVENTION

Figure 1:
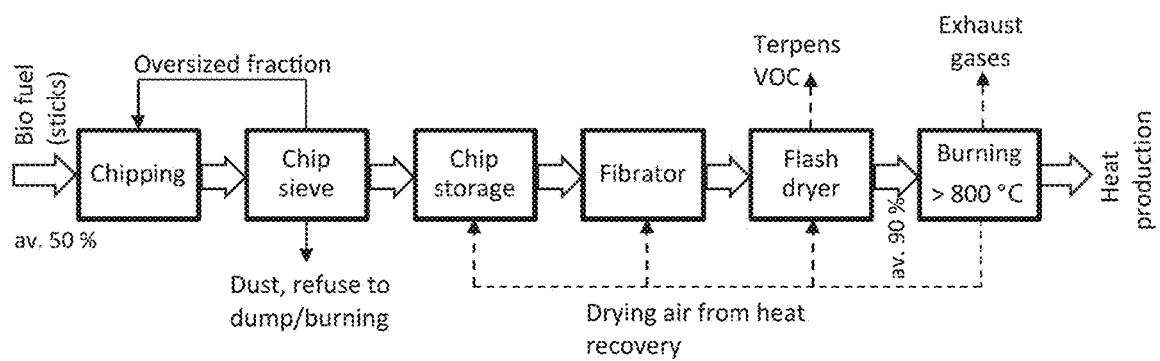
FIG. 1 shows schematically the finer making and drying of the biomaterial according to one preferred embodiment.

In this connection, the term "integrated process" refers to the fact that the making finer of the biomaterial, or, if the making finer is performed in several stages, at least the final stage of the finer making; the drying of the biomaterial, and the production of the heat required for drying, are all combined in the same process. In the process, drying is completed after the finer making stage of the biomaterial, however preferably in such a way that drying is commenced already in connection with finer making. The process is essentially a continuous process.

The term "essentially continuous process" refers to the fact that the biomaterial that has been made finer is intended to be taken to the drying stage without intermediate storage of a longer duration. Short-term stage intermediate storage can, however, be considered, for example to adjust the operating conditions of the drying process.

A "heat-releasing process" is typically a combustion process performed in a combustion plant. Alternatively, this can refer to a bio-refining process performed in a bio-refinery. Specific unit operations of a bio-refining process can produce excess heat (so-called waste heat), which has no practical use. Such waste heat can be used, according to the invention, for drying biomaterial.

According to one embodiment, the "combustion process" can be one that is intended specifically and only, according to the present invention, for producing the heat required for drying biomaterial. In this case, the "combustion plant" can consist of only a fireplace and chimney. The heat required for drying is recovered from the flue gas.

Alternatively, the "combustion process" can be one that is mainly intended to produce some other commodity. The combustion process can, for example, be one in which the combustion plant is part of a power plant, which produces high-pressure steam and electricity, as well as back-pressure steam for the requirements of industrial processes or the production of district heating. The combustion plant can be alternatively part of a heating centre, which produces only heat, for example in the form of hot water for district heating. In these alternatives, the heat required for drying can be taken from the flue gas or surplus steam of the combustion process, particularly from back-pressure steam or hot water. In all of these cases, in which the combustion process produces some other commodity, excess heat, i.e. so-called waste heat, typically arises, which can be used for drying biomaterial according to the present invention.

The drying of biomaterial can be performed in different ways. Drying can, for example, be performed in such a way that some heat-bearing medium, such as flue gas or superheated steam, is taken from the heat producing process, and is led directly to the biomaterial to be dried.

Alternatively, drying can be performed by means of a separate medium, which is heated in a heat exchanger. According to a preferred embodiment, the medium can be air, which is typically heated to 100-200° C. in a heat exchanger, in which the flue gas, steam, or hot water produced by the combustion plant, or the heat source of a bio-refinery is used.

A practicable "biomaterial" for the manufacture of a biofuel is typically some vegetable-based biomaterial. As non-restrictive examples can be mentioned:

timber material, particularly thinnings, such as first thinnings, brushwood, tree stumps, or bark, fibre and/or bio-slurry;
  peat;
  grasses, such as various grasses, hay, straw, rice waste, some cane or reed; or
  organic waste, such as vegetable or fruit peels from the foodstuffs industry.

Biomaterial can also be a mixture of the above, preferably a mixture of two or three different biomaterials.

The finer making of the biomaterial can be performed in different ways, as in one or more stages, according to the size and properties of the pieces of the raw material. If the question is of a material that is difficult to make finer (trees, especially stumps), there is usually reason to perform the finer making in several stages, so that in the first stage relatively large pieces are produced, for example by crushing or chipping. It is also good to cut grasses and similar elongated stalks into short pieces in the first stage and perform the actual finer making only in the second stage.

A possible first making finer stage of the biomaterial, such as crushing or chipping, can in principle be part of the integrated process according to the present invention. Alternatively, the first finer making stage can be a quite separate stage, preceding the integrated process.

The second (or proper) finer making stage is typically defibration or grinding. In the stage in question, a suitable piece size is sought for the material, which is sufficiently small for rapid and effective drying, but on the other hand not too small, so as to avoid the dust-explosion danger and other handling problems.

According to a particularly preferred embodiment, the biomaterial is chipped into chip typically 20-40-mm, preferably 25-30-mm long. In the next stage, the chips are defibrated in a defibrator, which is preferably a disc refiner or a conical refiner. The chips are led into this defibrator together with a hot gas flow, so that the drying of the material starts already in connection with defibration. The defibrated material is removed from the defibrator, preferably with the aid of a hot gas flow, such as a hot air flow and taken to a dryer, in which the material is dried to the desired final dryness.

The chips are defibrated typically to form a so-called sliver mass, the dimensions of the slivers of which are substantially smaller than those of the chips, such as a diameter of preferably 0.1-0.3 mm, most suitably 0.15-0.2 mm, and a length of preferably 1-5 mm, most suitably 2-4 mm.

According to one alternative, the sliver mass is mixed with compressed fibre and bio-slurry obtained from a paper or pulp mill, which preferably has a dry-matter content of 40-50%.

The final drying of the biomaterial that has been made finer is suitably performed in a flash dryer or in some other dryer, in which drying is performed with the aid of a hot gas, preferably hot air. Though the gas used for drying can alternatively be flue gas or superheated steam, heated air is a particularly preferred alternative. Flue gas can cause dampening of the material and corrosion problems, if the temperature drops below the condensation point of the water vapour in the flue gas, for example due to an operating disturbance. If superheated steam is used, care must be taken that the temperature of the drying process is not allowed to drop below the saturation temperature corresponding to the pressure prevailing in the steam.

In the following, the invention is described in greater detail with reference to the figures.

In FIG. 1, the biomaterial fed to chipping is some timber material, for example brushwood or thinnings or other timber waste. The dry-material content of the biomaterial fed to chipping is then typically about 50%. The diameter of the trees is, in turn, typically in the range 20-50 mm. The timber need not necessarily be debarked before chipping. Alternatively, the biomaterial is some grass, straw, rice waste, or similar.

It is recommended that the biomaterial fed to chipping does not contain metals, stones, or similar, which would damage the blades used inmaking finer. In principle, chipping can be performed by a standard chipper used in industry or a chipper suitably modified for this purpose. The chipper can be a so-called blowing model, in which the chips are blown directly onto the chip screen after chipping.

In chip screening, the excessively large fraction (screen-plate hole diameter about 45 mm) and the fines (screen-plate hole diameter 3 mm) are removed. The typical dimensions of coniferous timber chips are: length 25-30 mm, width 15-25 mm, and thickness less than 5 mm. The fraction remaining between the screens is led either to the chip store or directly to defibration. The excessively large fraction is led back to chipping and the fines (sawdust, sand, snow, etc.) are led either to burning or to dumping.

The chips are led to defibration, preferably at a raised temperature of more than 20° C. Defibration can be performed using a defibrator, such as an industrial defibrator, which is typically a disc refiner shown in FIG. 2.

Figure 2:
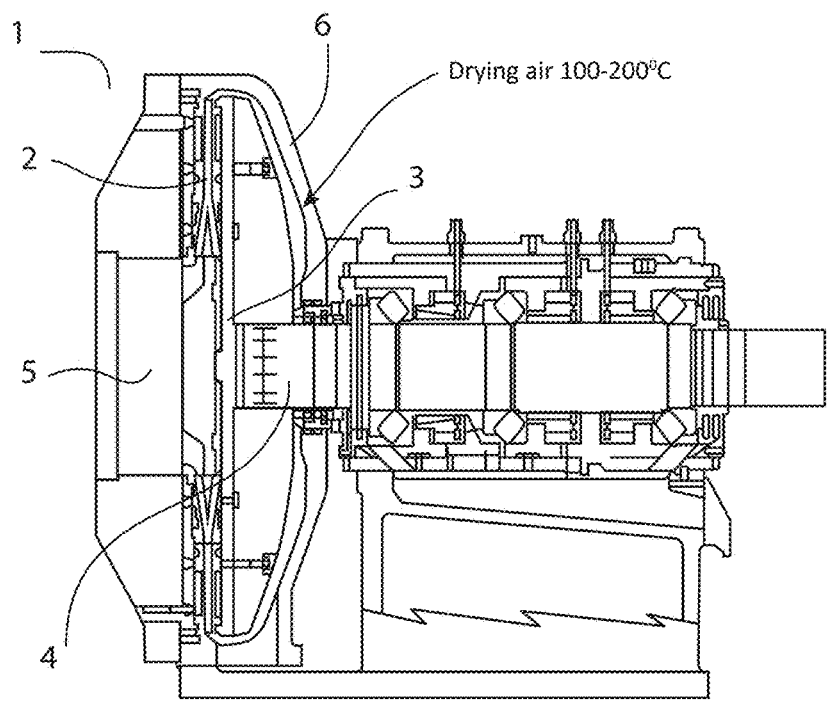
FIG. 2 shows a cross-sectioned side view of a suitable disc refiner for defibration.

FIG. 2 shows an, as such, known disc refiner 1, which consists of two grooved discs 2 and 3, in which disc 2 is, in the example of the figure, a stator and disc 3 a rotor, which is connected to a shaft 4.

Figure 3:
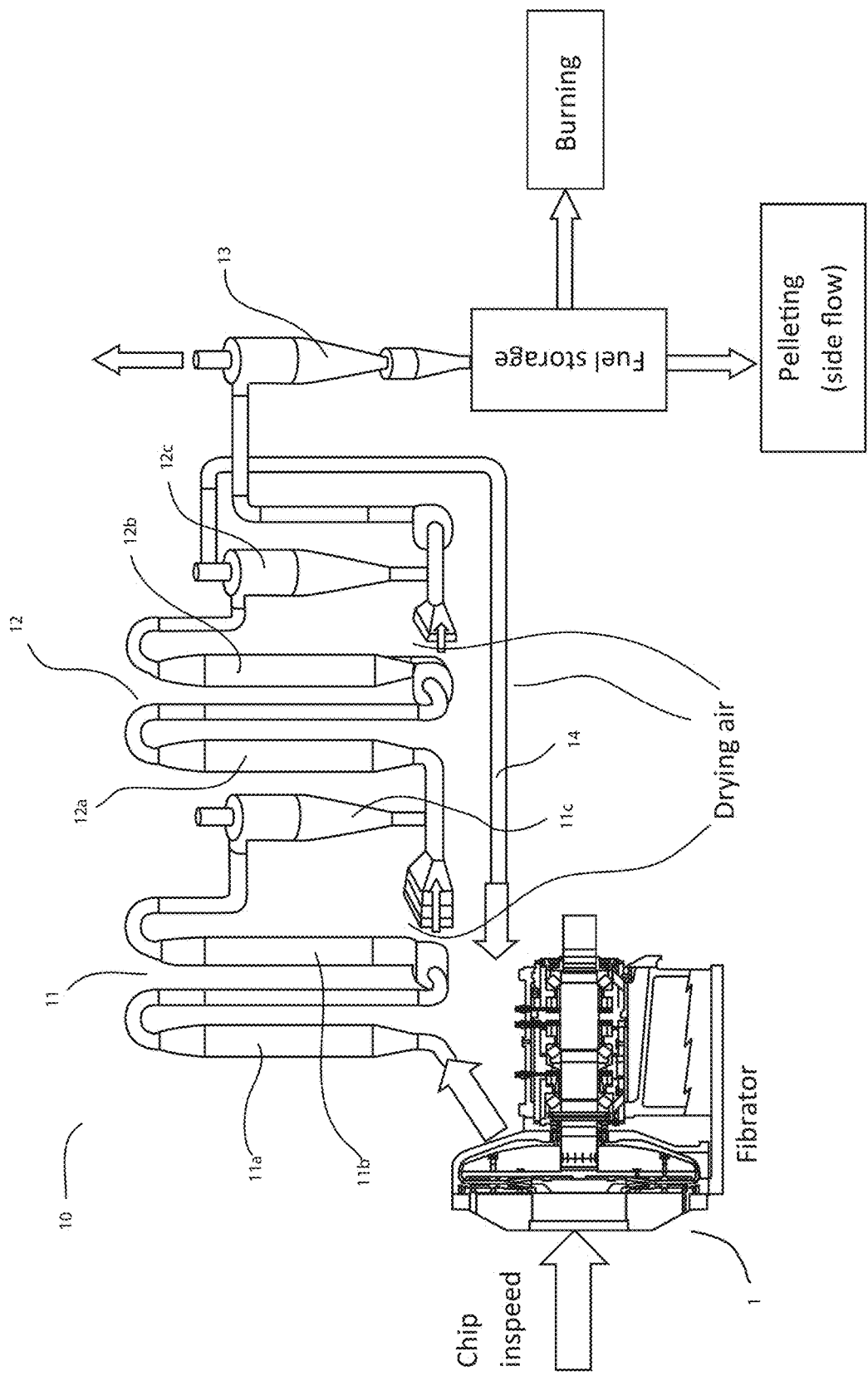
FIG. 3 shows the defibrator (disc refiner) according to FIG. 2 and a dryer connected after it.

According to the invention, the material to be defibrated (such as wood chips) is fed in the manner shown in FIG. 3 to the space between the discs 2 and 3, through a feed opening 5 located in the middle part of the device. The disc refiner's rotor 3 is rotated at a speed of 1000-2000 rpm, preferably about 1500 rpm, the estimated energy consumption being on 50-100 kWh/t of dry material.

Hot air, the temperature of which is preferably slightly above the boiling point of water, most suitably in the range 100-200° C., is also fed to the feed opening 5. During defibration, the material flows from the feed opening towards the periphery of the discs, from where it exits the device.

According to the invention, drying air can also be added to the blowing out of the defibrated material from the actual defibrator. Preferably the same drying air, the temperature of which is that stated above, is used for both purposes. For blowing out the material, drying air is led to the refiner housing 6 located behind the refiner rotor 3. The drying air thus acts as a carrier medium, by means of which the defibrated material is blown out of the defibrator to the drying stage, in the manner shown in FIG. 3.

In the disc refiner 1, the chips are defibrated to form a so-called sliver mass, in which the dimensions of the slivers are substantially smaller than those of the chips, such as a diameter of preferably 0.1-0.3 mm, most suitably 0.15-0.2 mm, and a length of preferably 1-5 mm, most suitably 2-4 mm.

FIG. 3 shows the disc refiner 1 of FIG. 2, which here is connected to a drying apparatus according to the invention, which in this case is a flash drying apparatus 10 according to one embodiment. In the solution of the figure, this drying apparatus 10 consists of two consecutive drying units 11 and 12. Both units comprise their own drying channel 11a,11b and 12a,12b. In this solution, both units have also their own separators 11c and 12c. According to this embodiment, not only damp air but also volatile organic compounds (VOC=volatile organic compounds) are removed from the separator 11c of the first drying unit. These include particularly terpenes. These can be recovered and taken to further refining or to combustion.

In the solution of FIG. 3, in which two drying units 11 and 12 are utilized, the partly dried biomaterial, separated from the bottom of the first drying unit 11c, is led, preferably with fresh drying air, to a second drying stage 12, and the dried material is separated from a separator 12c.

Also when using a single or several drying units, they are led to a separator, such as the separator 12c of the figure, from which the air removed is led, according to this embodiment, along a channel 14 to the refiner housing behind the rotor 3 of the disc refiner 1, in the manner shown in FIG. 2. The biomaterial removed from the separator 12c is, in turn, mixed further with the fresh drying air and the final dried biomaterial is led from the separator 13 to store, from where it can be led as such to further use, such as combustion. Combustion can be performed either in the combustion plant, from which the drying heat was taken, or in another combustion plant, preferably located nearby. Alternatively, the dried biomaterial can be entirely or partly led to pelletizing or a bio-refinery for the manufacture of some further refined biofuel, such as biodiesel.

According to FIG. 3, the biomaterial, i.e. the "sliver mass" is dried with the aid of drying air (obtained from combustion heat recovery) from the original dry-material content, which is preferably about 50%, to the final dry-material content, which is preferably 85-95%, typically about 90%.

Because the dimensions of the "sliver mass" are relatively small and both the mass transfer and thermal transfer very efficient, the delay time required in drying remains very short. When the "sliver mass" is dried, the amount of water to be evaporated from the feed dry material (for example 50%) to the final dry material (for example 90%), is about 0.9 tonnes of water per tonne of dry material. The energy consumption of the flash dryer is thus 2800-4000 kJ/kg of water, i.e. heat is required 2500-3600 kJ/kg of dry material to evaporate the water. The drying air required is estimated to be 1.5-3 kg of dry air/kg of dry material.

The embodiment shown in FIG. 4 comprises a dryer part consisting of two drying units 11, 12, like that shown in FIG. 3. In addition, the equipment circuit comprises a pre-heater 15, which is connected by a feed line 18 to a disc refiner 1. A wood-chip feed line 16 comes to the pre-heater 15 and a cooled circulating-gas outlet line 17 exits from it. The temperature of the gas leaving the pre-heater 15 is about 100° C. The gas can be led, for instance, to heat recovery or some other utilization. After the disc refiner, a first separator 25 is located, in which the gas that has travelled through the disc refiner 1 is removed from the fibre mass, in order to increase the density of the mass. With the aid of the separation of the gas and the fibre mass, part of the gas flow fed to the disc refiner 1 is separated from the fibre mass. Because this gas flow has cooled by only about 120-150° C. having travelled through the disc refiner, it is advantageous to recover it and lead it to the pre-heater 15 along a connecting line 24 fitted between the pre-heater 15 and the first separator 25. In this way, the thermal energy of the gas exiting from the refiner is exploited. By means of preheating, the wood chips are softened and their structure and moisture content is made more suitable for grinding, which further improves the quality of the product and the energy efficiency of the system.

From the first separator 25 the fibre mass is fed to the mixing and feed unit 26, where hot drying gas is mixed with it. The drying gas is formed in a burner 19, to which is fed preferably biofuel dried with the aid of the method and air in order to burn the biofuel. At least part of the burner's flue gas is led, at a temperature of about 400° C., along a gas line 20 to the mixing and feed unit 26, in which the gas flow is mixed with the fibre mass with the aid of blowers. A return line 14 from the separator 12c of the second drying unit 12 also comes to the mixing and feed unit 26 and the circulating drying gas too is mixed with the hot drying gas and the fibre mass. From the mixing and feed unit, the gas and fibre mixture is led to the first drying unit 11. From the first drying unit's separator 11c an outlet line 22 leaves to the dryer-air return line 23, which leads to the disc refiner 1. The dryer-gas outlet line 21 of the final separator 13 is also connected to the dryer-air return line. In this way, the drying gas that has cooled to about 200° C. in the dryer is exploited as a feed-gas flow heating the disc refiner 1. The temperature of the biofuel exiting the final separator is in the order of 200° C.

The circuit example described above is intended to depict the idea of the invention that, by leading the biofuel flow, i.e. the wood chips and the fibre mass formed from it, and the hot gas flow separated from the biofuel flow in opposite directions, in such a way that the hotter gas flow is always led to a process stage of the treatment of the biofuel at a lower temperature, when the heat content of the separated gas flow can be exploited to raise the temperature of the earlier process stages. In this way, high energy efficiency is achieved.

Figure 7:
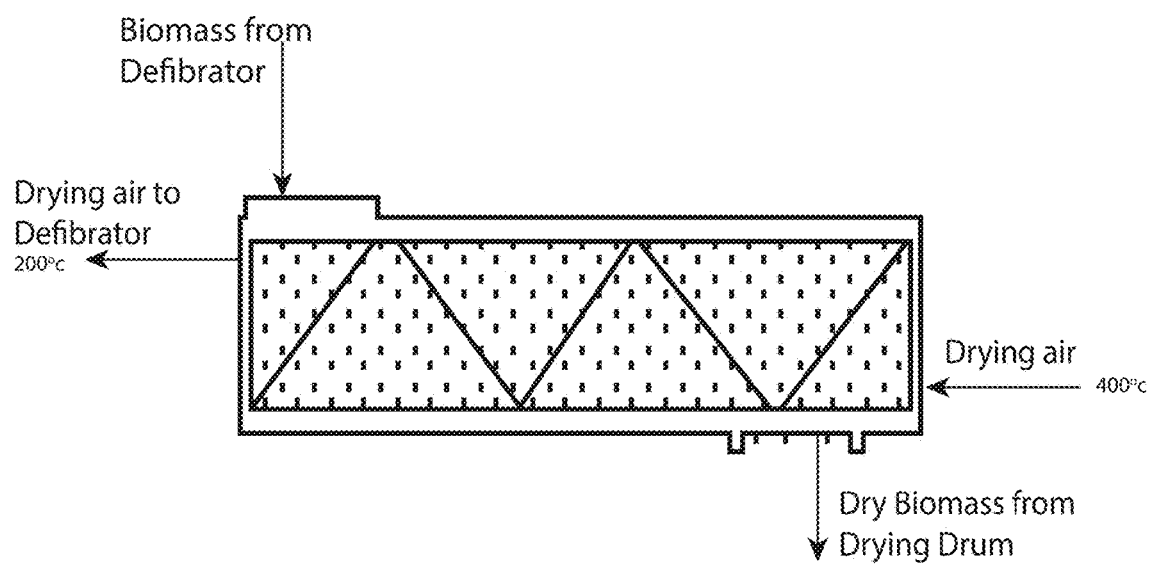
FIG. 7 is a schematic diagram of the mass flows and construction of a second dryer suitable for use in connection with the invention.

FIGS. 5 and 6 depict a dryer alternative, which can be used instead of the flash dryer depicted in the previous examples. In this case, the drum dryer has a cylindrical drum 27, on the internal circumference of which are blades 28 pointing towards its centre line. When the drum rotates, the blades lift the mass 29 to be dried onto the drum's internal circumference and drop again onto the bottom of the drum. In this way, the mass is effectively mixed and can dry through the effect of the hot drying gas. Drying gas (in this case preferably combustion gas from the burner) at about 400° C. is fed to the dryer drum 27 and gas that has cooled to about 200° C. is removed to the disc refiner, from which, in turn bio-fibre mass is fed to the dryer. If necessary, the dry bio-fibre mass is led to the next drying stage or to further use. In the dryer shown in FIG. 7, the mass flows in the dryer correspond to those in the cases of FIGS. 5 and 6. The dryer differs from the former in that in this alternative inside the dryer is a helical blade, which moves the bio-fibre mass parallel to the axis of the cylindrical drum of the dryer, at the same time mixing it in order to achieve effective drying.

The burning of the dried biomaterial is performed using conventional technology. The most suitable applications include coal-fired boilers, in which a "sliver mass" can replace coal either entirely or partly.

The invention is not intended to be restricted to the embodiments described above by way of example, instead the invention is intended to be applied widely within the scope of the protection of the Claims presented hereinafter.

The invention claimed is:

1. A method for manufacturing a biofuel from a vegetable-based biomaterial, comprising the integrated steps of making the biomaterial finer in at least one stage by defibration and drying the biomaterial with the aid of heat brought from a heat-releasing process wherein:
   the drying starts in the grinder and is finalized after the finer making stage,
   the defibration is done to sliver mass, the slivers having a diameter of 0.1 to 0.3 mm and length of 1 to 5 mm, and
   the heat-releasing process is one that is intended specifically and only for producing the heat required for drying the biomaterial by combusting the biofuel.

2. The method according to claim 1, wherein the manufacturing is performed essentially as a continuous operation.

3. The method according to claim 1, wherein the biomaterial is selected from the group of:
   timber material;
   peat;
   grass plants;
   organic waste,
or some mixture of the aforementioned.

4. The method according to claim 1, further comprising;
   chipping the biomaterial is to form chips that are substantially 20-40 mm long, wherein the chips are defibrated in a defibrator, removing the defibrated material from the defibrator, wherein the defibrated material is dried in a drier by leading a hot gas into the drier, and recovering the dried material.

5. The method according to claim 4, wherein the biomaterial is timber material and wherein the biomaterial is chipped to form chips having a length of 20-40 mm, a width of 10-30 mm, and a thickness of less than 5 mm.

6. The method according to claim 5, further comprising; screening the chips to separate impurities before the chips are led to defibration, and sending back excessively large wood pieces to be chipped.

7. The method according to claim 1, wherein the heat-releasing process is a combustion process or a treatment process of a bio-refinery.

8. The method according to claim 1, wherein the heat-releasing process is a combustion process, which is combined with production of high-pressure steam and electricity, or production of district heating.

9. The method according to claim 1, wherein the biomaterial is dried with the aid of waste heat of a heat-releasing process.

10. The method according to claim 1, wherein air having a temperature of 100-200° C. is used in the drying of the biomaterial.

11. The method according to claim 1, wherein air is used in the drying of the biomaterial, and wherein the air is used as a carrying medium to transport the defibrated mass away from a defibrator to a drier.

12. The method according to claim 1, wherein the drying includes flash drying in one or more stages.

13. The method according to claim 1, wherein the biomaterial is dried to a dry-material content of 85-95%.

14. A biofuel, manufactured from a vegetable-based biomaterial, wherein the biofuel is manufactured in an integrated manner comprising the steps of; making the biomaterial finer in at least one stage of integrated defibration and drying with the aid of heat from a heat-releasing process wherein:

the drying starts in the grinder and is finalized after the finer making stage, the defibration is done to sliver mass, the slivers having a diameter of 0.1 to 0.3 mm and length of 1 to 5 mm, and the heat-releasing process is one that is intended specifically and only for producing the heat required for drying the biomaterial by combusting the biofuel.

15. The biofuel according to claim 14, refined into pellets or a liquid fuel.

16. The method of claim 1, wherein the drying and defibration are integrated by leading a hot gas flow through a defibrator.

17. The method of claim 16, wherein the biomaterial and hot gas flow are fed through the defibrator simultaneously.

18. A method for manufacturing a liquid biofuel from a vegetable-based biomaterial, comprising the integrated steps of making the biomaterial finer in at least one stage by defibration and drying the biomaterial with the aid of heat brought from a heat-releasing process wherein:

the drying starts in the grinder and is finalized after the finer making stage, the defibration is done to sliver mass, the slivers having a diameter of 0.1 to 0.3 mm and length of 1 to 5 mm, the heat-releasing process is one that is intended specifically and only for producing the heat required for drying the biomaterial by combustion, and liquid biofuel is manufactured from the biomaterial that has been made finer and dried.

* * * * *